(12) United States Patent
Thaler

(10) Patent No.: US 8,583,822 B2
(45) Date of Patent: Nov. 12, 2013

(54) METHOD AND SYSTEM FOR MINIMUM FRAME SIZE SUPPORT FOR A COMMUNICATION PROTOCOL ENCAPSULATED OVER ETHERNET

(75) Inventor: Patricia Ann Thaler, Carmichael, CA (US)

(73) Assignee: Broadcom Corporation, Irvine, CA (US)

(*) Notice: Subject to any disclaimer, the term of this patent is extended or adjusted under 35 U.S.C. 154(b) by 932 days.

(21) Appl. No.: 12/144,268

(22) Filed: Jun. 23, 2008

(65) Prior Publication Data

US 2008/0320162 A1    Dec. 25, 2008

Related U.S. Application Data

(60) Provisional application No. 60/945,538, filed on Jun. 21, 2007.

(51) Int. Cl.
*G06F 15/16* (2006.01)
*G01R 31/08* (2006.01)
*H04L 12/28* (2006.01)
*H04J 3/16* (2006.01)
*H04J 3/24* (2006.01)

(52) U.S. Cl.
USPC .......... 709/236; 370/235; 370/238; 370/389; 370/465; 370/474

(58) Field of Classification Search
USPC .......... 709/230–237; 370/465–466, 389, 392, 370/474; 725/25
See application file for complete search history.

(56) References Cited

U.S. PATENT DOCUMENTS

| 5,999,541 | A * | 12/1999 | Hinchey et al. | 370/466 |
| 6,970,478 | B1 * | 11/2005 | Nishihara | 370/474 |
| 2006/0104268 | A1 * | 5/2006 | Lee et al. | 370/389 |
| 2006/0251067 | A1 * | 11/2006 | DeSanti et al. | 370/389 |
| 2008/0028096 | A1 * | 1/2008 | Henderson et al. | 709/236 |
| 2008/0056300 | A1 * | 3/2008 | Williams | 370/466 |

* cited by examiner

*Primary Examiner* — Evans Desrosiers
(74) *Attorney, Agent, or Firm* — Thomas | Horstemeyer, LLP

(57) ABSTRACT

Certain aspects of a method and system for minimum frame size support for a communication protocol encapsulated over Ethernet may include an encapsulated protocol over Ethernet (EPoE) frame comprising a start of padding (SP) field. In the EPoE frame, a size of an encapsulated protocol frame that is less than a size of an Ethernet frame may be adjusted by insertion of one or more padding bits so that the size of the encapsulated protocol frame is equal to the size of the Ethernet frame. The SP field may indicate a starting location of the insertion of one or more padding bits within the EPoE frame. The SP field comprises an offset value that may be relative to a location of a word in which the SP field is located or is relative to a location of a word corresponding to a fixed offset from a start of the encapsulated protocol frame.

20 Claims, 4 Drawing Sheets

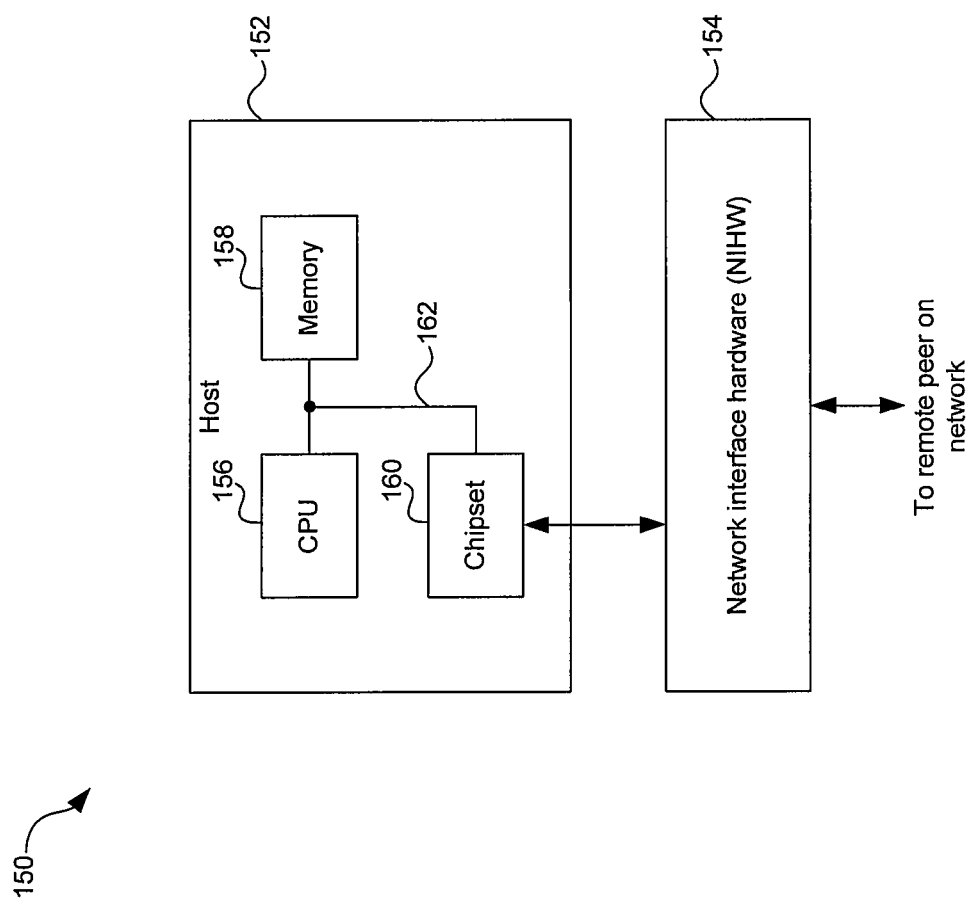

METHOD AND SYSTEM FOR MINIMUM FRAME SIZE SUPPORT FOR A COMMUNICATION PROTOCOL ENCAPSULATED OVER ETHERNET

CROSS-REFERENCE TO RELATED APPLICATIONS/INCORPORATION BY REFERENCE

This application makes reference to, claims priority to, and claims the benefit of U.S. Provisional Application Ser. No. 60/945,538 filed on Jun. 21, 2007.

The above stated application is hereby incorporated by reference herein its entirety.

FIELD OF THE INVENTION

Certain embodiments of the invention relate to communication networks. More specifically, certain embodiments of the invention relate to a method and system for minimum frame size support for a communication protocol encapsulated over Ethernet.

BACKGROUND OF THE INVENTION

Computer networks comprise a plurality of interconnected networking devices, such as routers, switches and/or computers. The physical connection that allows one networking device to communicate with another networking device is referred to as a link. Links may utilize wired or wireless communication technologies. Data may be communicated between networking devices via the link in groups of binary bits referred to as packets. The rate at which networking devices may communicate data via a link is referred to as link speed.

Demands for increasing link speeds and computing speeds have driven a variety of specialized computer networking architectures. There are networking architectures, such as Ethernet, which are widely utilized for communications based on the Internet Protocol (IP). There are other networking architectures, such as Fibre Channel, which are widely utilized in storage area network (SAN) architectures. Still other networking architectures are utilized in cluster computing architectures. Networking devices, which communicate via one or more of the diverse computer networking architectures may comprise distinct input and output (I/O) interfaces for communicating with each of the one or more diverse computer networking architectures.

Fibre Channel over Ethernet (FCoE) is a technology that comprises a number of proposals, which may define a single networking technology that may be utilized IP communications, SAN and cluster computing, for example. In one aspect, FCoE may define a method of data encapsulation, in which Fibre Channel (FC) frames may be encapsulated within an Ethernet frame.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for minimum frame size support for a communication protocol encapsulated over Ethernet, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

FIG. 1A is a diagram that illustrates an exemplary EPoE frame, in accordance with an embodiment of the invention.

DETAILED DESCRIPTION OF THE INVENTION

Figure 1B:
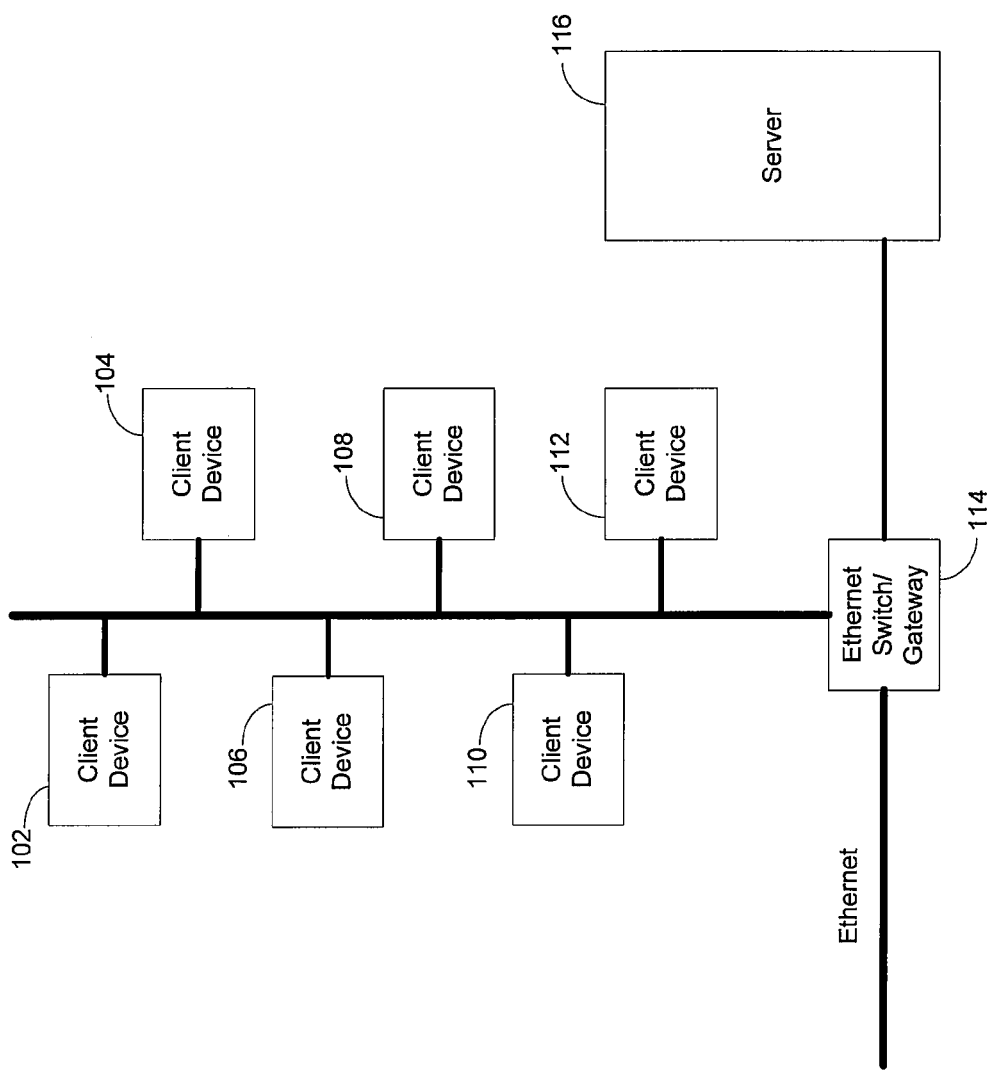
FIG. 1B is a block diagram of exemplary networking system with a gateway, in accordance with an embodiment of the invention.

Certain embodiments of the invention may be found in a system and/or method for minimum frame size support for a communication protocol encapsulated over Ethernet. Certain aspects of a method may comprise an encapsulation protocol over Ethernet (EPoE) frame that may comprise a start of padding (SP) field. The SP field may identify the starting location of the padding field within the EPoE frame. In various embodiments of the invention, the SP may define an offset location measured in byte units or word units. Word units allow a smaller SP field to indicate the offset for those protocols where frame length may be a multiple of word length. In an exemplary embodiment of the invention, the SP field may indicate an offset value relative to the location of the word in which the SP field appears. Thus, for an SP field located in word $w_0$ within the EPoE frame, which comprises an offset value $w_{off\_0}$, the start of the padding field may begin at word $w_0 + w_{off\_0}$ within the EPoE frame. An offset value $w_{off\_0} = 0$ may indicate that there is no padding field within the EPoE frame. In this regard, the SP field may enable the insertion of a padding field when needed to enable the size of the EPoE frame to be equal to the minimum Ethernet frame size, while omitting a padding field when not needed.

In another exemplary embodiment of the invention, the SP field may indicate an offset value relative to the location $w_n$ words after the start of the encapsulated protocol frame where $w_n$ is the minimum frame length for the encapsulated protocol. Thus, for an encapsulated protocol frame, which starts at word location $w_1$ within the EPoE frame and an SP field, which comprises an offset value $w_{off\_1}$, the start of the padding field may begin at word $w_1 + w_n + w_{off\_1}$ within the EPoE frame. An offset value $w_{off\_1} = 0$ may indicate that there is no padding field within the EPoE frame.

FIG. 1A is a block diagram illustrating a host with network interface hardware, in accordance with an embodiment of the invention. Referring to FIG. 1A, there is shown a networking system 150, such as a server, a client, or a similar network machine, for example, that may comprise a host 152 and a network interface hardware (NHW) device 154. The host 152 may comprise a central processing unit (CPU) 156, a memory 158, and a chipset 160. The CPU 156, the memory 158, and the chipset 160 may be communicatively coupled via, for example, a bus 162.

The networking system 150 may enable operation or support of various networking protocols. For example, the networking system 150 may enable supporting of Internet control message protocol (ICMP), IP, TCP/IP, Fibre Channel over Ethernet (FCoE), InfiniBand, Serial Advanced Technology Attachment (SATA) for example. The ICMP protocol may refer to an ISO/OSI layer 3 protocol that may allow routers, for example, to send error and/or control messages about packet processing on IP networks.

The host 152 may enable setup parameters for network connections. For example, the host 152 may setup transport layer parameters comprising information that support time stamping, window scaling, delayed acknowledgment policy, flow control scheme to be used, congestion handling, selective acknowledgement (SACK), buffers to be used, and/or other transport related parameters. The host 152 may also setup network layer parameters comprising information that supports IPv4 or IPv6, for example, and options such as no fragments and/or hop limit. The host 152 may also setup data link layer parameters comprising information that supports virtual local area networks (VLAN) and source address to be used, for example.

The CPU 156 may comprise suitable logic, circuitry, and/or code that may enable supporting of the management and/or performance of networking operations associated with remote peers or clients on a network. The CPU 156 may also enable supporting of the management and/or performance of service applications that may be provided to the remote clients on the network.

The memory 158 may comprise suitable logic, circuitry, and/or code that may enable storage of information regarding the networking operations and/or service applications supported by the CPU 156. The chipset 160 may comprise suitable logic, circuitry, and/or code that may enable supporting of memory management, PCI master and arbitrator, graphics interface, I/O master for USB, audio, and/or peripheral devices, for example. In this regard, the chipset 160 may comprise one or more integrated circuits (IC) that provides services to support the CPU 156 operations. In some instances, the services provided by the chipset 160 may be implemented in separate ICs. The choice of one or more ICs for implementing the chipset 160 may be based on the number and/or type of services provided. The NIHW device 154 may comprise suitable logic, circuitry, and/or code that may enable communication with the host 152. In this regard, the NIHW device 104 may enable communication with the CPU 156, the memory 158, and/or the chipset 160.

EPoE enables the encapsulation of frames native to another network in Ethernet frames. Ethernet frames comprise a plurality of bytes, for example, 64 bytes which may be organized in word format, wherein a single word may comprise 4 bytes, for example. One limitation of the EPoE model is that while the minimum Ethernet frame size may be 64 bytes, the minimum frame size for an encapsulated frame may be less than 64 bytes, for example, 49-52 bytes.

The size of an encapsulated protocol frame may be adjusted by inserting a padding field, which comprises one or more padding bytes. For example, adding 15 padding bytes to each encapsulated protocol frame may ensure that the minimum adjusted encapsulated protocol frame size will be at least equal to the minimum Ethernet frame size. One limitation of this approach, however, is that network bandwidth may be wasted for transmitting padding bytes within encapsulated protocol frames, which were not smaller than the minimum Ethernet frame size, and therefore did not need any padding bytes at all.

Accordingly, various embodiments of the invention may comprise a method and system for adjusting the size of an encapsulated protocol frame, which are smaller than the minimum Ethernet frame size such that the minimum size of the adjusted encapsulated protocol frame is equal to the minimum Ethernet frame size.

FIG. 1B is a block diagram of exemplary networking system with a gateway, in accordance with an embodiment of the invention. Referring to FIG. 1B, there is shown a plurality of client devices 102, 104, 106, 108, 110 and 112, an Ethernet switch/gateway 114 and a server 116. Notwithstanding, the plurality of client devices 102, 104, 106, 108, 110 and 112 may be coupled to the Ethernet switch/gateway 114 in a star topology, for example, without limiting the scope of the invention.

The plurality of client devices 102, 104, 106, 108, 110 and 112 and the server 116 may comprise suitable logic, circuitry and/or code that may be enabled to process various encapsulated protocol over Ethernet (EPoE) frames via the Ethernet switch/gateway 114.

The Ethernet switch/gateway 114 may comprise suitable logic and/or circuitry that may be enabled to switch between the plurality of clients 102, 104, 106, 108, 110 and 112 and the server 116. In one embodiment, the server 116 may be operating over a non-Ethernet network while the client devices 102, 104, 106, 108, 110 and 112 may be connected to the Ethernet switch/gateway 114 through Ethernet links. The switch/gateway 114 encapsulates frames from the server 116 using EPoE to transmit them over Ethernet to the client devices 102, 104, 106, 108, 110 and 112. The Ethernet switch/gateway 114 may be enabled to determine whether the size of an encapsulated protocol frame is less than the size of the Ethernet frame. The Ethernet switch/gateway 114 may be enabled to determine an offset value in the SP field shortly after the EPoE frame arrives.

Figure 2:
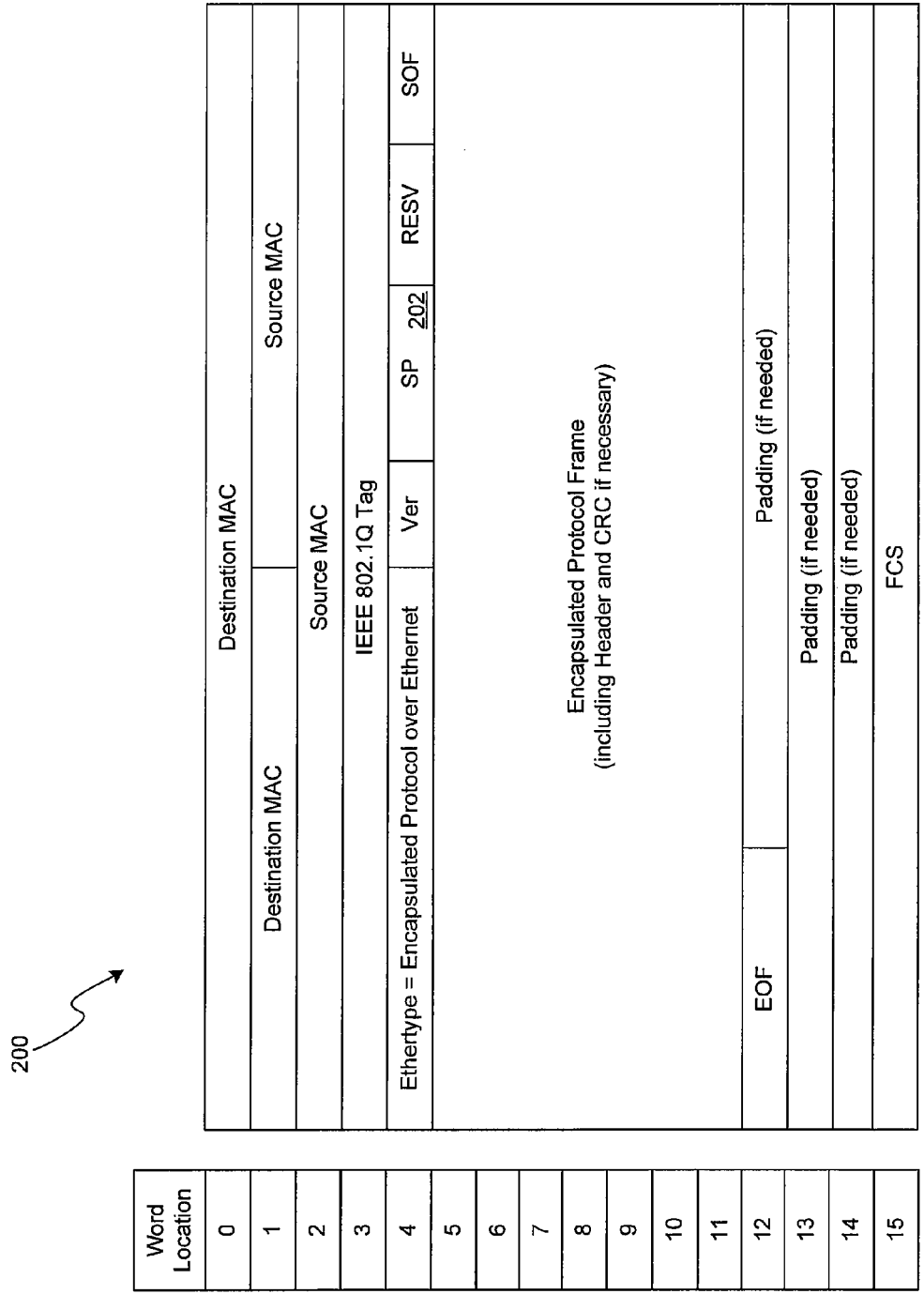
FIG. 2 is a diagram that illustrates an alternative exemplary EPoE frame, in accordance with an embodiment of the invention.

FIG. 2 is a diagram that illustrates an exemplary encapsulated protocol over Ethernet (EPoE) frame, in accordance with an embodiment of the invention. Referring to FIG. 2, there is shown an EPoE frame, in accordance with an embodiment of the invention. In the exemplary EPoE frame as shown in FIG. 2, the word locations w=0 to 2 may comprise source and destination MAC addresses. The word location w=3 may comprise an IEEE 802.1Q Tag field, which may enable multiple virtual networks across a single physical infrastructure. The word location w=4 comprises an Ethertype (ET) field, a version (Ver) field, a start of padding (SP) field 202, a reserved (RESV) field, and a start of frame (SOF) field. The word locations w=5 to 11 may comprise the encapsulated protocol frame. The encapsulated protocol frame may comprise a header, payload and a CRC field if necessary to check for errors. The word location w=12 may comprise an end of frame (EOF) field and an optional padding field. The word locations w=13 to 14 may comprise optional padding fields. The word location w=15 may comprise a frame check sequence (FCS) field to check for errors in the Ethernet frame.

In an exemplary embodiment of the invention, the ET field may comprise 16 bits to indicate the type of encapsulated protocol over Ethernet, for example, Fibre Channel over Ethernet and the Ver field may comprise 2 bits. In various embodiments of the invention, the SP field 202 may comprise from 2 to 4 bits, the RESV field may comprise from 2 to 102 bits and the SOF field may comprise from 4 to 8 bits. The SOF field may indicate the start of the encapsulated protocol frame and the EOF field may indicate the end of the encapsulated protocol frame. In accordance with an exemplary embodiment of the invention, a value of zero in the SP field 202 may indicate that no padding is required.

In accordance with an exemplary embodiment of the invention, the SP field 202 may indicate an offset value $w_{off}$, that may be measured relative to the SP field 202 or word location of the SP field 202, for example, w=4. The largest offset value may occur when the padding field begins at word location w=14, since the last field in the EPoE frame 150 at word location w=15 is the Ethernet frame check sequence (FCS) field. In this regard, the largest offset value may be $w_{off}$=10. Thus, the range of offset values $0 \leq w_{off} \leq 10$ may be enumerated in a 4 bit binary representation and correspondingly, the SP field 202 may comprise 4 bits.

In accordance with another exemplary embodiment of the invention, the SP field 202 may indicate an offset value $w_{off}$, that may be measured relative to the end of the encapsulated protocol frame field or word location w=11. The largest offset value may occur when the padding field begins at word location w=14, since the last field in the EPoE frame 150 at word location w=15 is the Ethernet FCS field. In this regard, the largest offset value may be $w_{off}$=3. Thus, the range of offset values $0 \leq w_{off} \leq 3$ may be enumerated in a 2 bit binary representation and correspondingly, the SP field 202 may comprise 2 bits. In accordance with various embodiments of the invention, the SP field 202 may be located within the EPoE frame at word locations other than word location w=4, for example.

Figure 3:
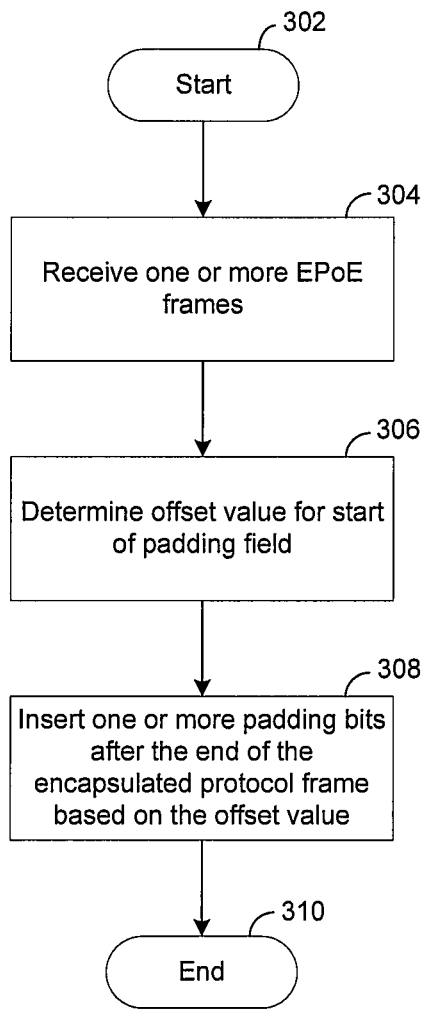
FIG. 3 is a flowchart illustrating exemplary steps for minimum frame size support for a communication protocol encapsulated over Ethernet, in accordance with an embodiment of the invention.

FIG. 3 is a flowchart illustrating exemplary steps for minimum frame size support for a communication protocol encapsulated over Ethernet, in accordance with an embodiment of the invention. Referring to FIG. 3, exemplary steps may begin at step 302. In step 304, one or more EPoE frames may be received. In step 306, an offset value may be determined for the start of padding field based on the received one or more EPoE frames. The offset value may be measured relative to the location of the word where the start of padding field is located or may be measured relative to a fixed offset from the start of the encapsulated protocol frame field or word location. In step 308, one or more padding bits may be inserted after the end of the encapsulated protocol frame based on the offset value. Control then passes to end step 310.

In accordance with various embodiments of the invention, a method and system for minimum frame size support for a communication protocol encapsulated over Ethernet may comprise an encapsulated protocol over Ethernet (EPoE) frame 200. The EPoE frame 200 comprises a start of padding (SP) field 202. The network interface hardware (NIHW) 154 may be enabled to adjust the size of an encapsulated protocol frame that is less than a size of an Ethernet frame by inserting one or more padding bits. The SP field 202 may indicate a starting location of the insertion of one or more padding bits within the EPoE frame. The SP field 202 may comprise an offset value. In one embodiment of the invention, the offset value may be relative to a location of a word in which the SP field 202 is located. Accordingly, the SP field 202 may comprise four bits to represent the offset value. The unit of the offset value may be in bytes or words, for example. In another embodiment of the invention, the offset value may be relative to a location of a word corresponding to a fixed offset from the start of the encapsulated protocol frame. Accordingly, the SP field 202 may comprise two bits to represent the offset value. If the offset value is equal to zero, no insertion of padding bits may be indicated. The SP field 202 may be located in a word corresponding to a location of an Ethertype field. The encapsulated protocol may comprise one or more of Fibre Channel, InfiniBand, and/or Serial Advanced Technology Attachment (SATA). The NIHW 154 may be enabled to insert one or more padding bits to increase the size of the encapsulated protocol frame to be equal to the size of the Ethernet frame.

The NIHW 154 may be enabled to determine whether the size of an encapsulated protocol frame is less than the size of the Ethernet frame. The NIHW 154 may be enabled to insert a value of zero in the one or more padding bits if the size of the encapsulated protocol frame is equal to the size of the Ethernet frame.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for minimum frame size support for a communication protocol encapsulated over Ethernet.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating data, the method comprising:
 receiving a network frame;
 encapsulating the network frame as an encapsulated protocol frame;
 determining whether a size of the encapsulated protocol frame is less than a size of an Ethernet frame;
 adjusting the size of the encapsulated protocol frame that is less than the size of the Ethernet frame by inserting one or more padding bits in the encapsulated protocol frame;
 determining an offset value, wherein said offset value is measured relative to a defined location of the encapsulated protocol frame and identifies a starting location of said one or more padding bits within said encapsulated protocol frame; and inserting said offset value within a start-of-padding field contained in a header for said encapsulated protocol frame, wherein an encapsulated protocol of said encapsulated protocol frame comprises one or more of Fibre Channel, InfiniBand, or Serial Advanced Technology Attachment (SATA).

2. The method according to claim 1, wherein said defined location is a location of a word in which said start-of-padding field is located.

3. The method according to claim 1, wherein a unit of said offset value is in bytes.

4. The method according to claim 1, wherein said defined location is a location of a word corresponding to a fixed offset from a start of said encapsulated protocol frame.

5. The method according to claim 1, wherein a unit of said offset value is in words.

6. The method according to claim 1, comprising indicating no insertion of said padding bits when said offset value is equal to zero.

7. The method according to claim 1, wherein said start-of-padding field is located in a word corresponding to a location of an Ethertype field.

8. The method according to claim 1, comprising inserting a value of zero in said one or more padding bits if said size of said encapsulated protocol frame is equal to said size of said Ethernet frame.

9. A system for communicating data, the system comprising:
one or more processors that enables processing of an encapsulated protocol frame, wherein said one or more processors are operable to:
receive a network frame;
encapsulate the network frame as an encapsulated protocol frame;
determine whether a size of the encapsulated protocol frame is less than a size of an Ethernet frame;
adjust the size of the encapsulated protocol frame that is less than the size of the Ethernet frame by insertion of one or more padding bits in the encapsulated protocol frame;
determine an offset value, wherein said offset value is measured relative to a defined location of the encapsulated protocol frame and identifies a starting location of said one or more padding bits within said encapsulated protocol frame; and
insert said offset value within a start-of-padding field contained in a header for said encapsulated protocol frame,
wherein an encapsulated protocol of said encapsulated protocol frame comprises one or more of Fibre Channel, InfiniBand, or Serial Advanced Technology Attachment (SATA).

10. The system according to claim 9, wherein said defined location is a location of a word in which said start-of-padding field is located.

11. The system according to claim 10, wherein a unit of said offset value is in bytes.

12. The system according to claim 9, wherein said defined location is a location of a word corresponding to a fixed offset from a start of said encapsulated protocol frame.

13. The system according to claim 12, wherein a unit of said offset value is in words.

14. The system according to claim 9, wherein said one or more processors enables indication of no insertion of said padding bits when said offset value is equal to zero.

15. The system according to claim 9, wherein said start of padding field is located in a word corresponding to a location of an Ethertype field.

16. The system according to claim 9, wherein said one or more processors enables insertion of a value of zero in said one or more padding bits if said size of said encapsulated protocol frame is equal to said size of said Ethernet frame.

17. A non-transitory computer readable medium having executable instructions that, when executed by a hardware processor, causes the processor to:
receive a network frame;
encapsulate the network frame as an encapsulated protocol frame;
determine whether a size of the encapsulated protocol frame is less than a size of an Ethernet frame;
adjust the size of the encapsulated protocol frame that is less than the size of the Ethernet frame by inserting one or more padding bits in the encapsulated protocol frame;
determine an offset value, wherein said offset value is measured relative to a defined location of the encapsulated protocol frame and identifies a starting location of said one or more padding bits within said encapsulated protocol frame; and
insert said offset value within a start-of-padding field contained in a header for said encapsulated protocol frame,
wherein an encapsulated protocol of said encapsulated protocol frame comprises one or more of Fibre Channel, InfiniBand, or Serial Advanced Technology Attachment (SATA).

18. The non-transitory computer readable medium according to claim 17, wherein said defined location is a location of a word corresponding to a fixed offset from a start of said encapsulated protocol frame.

19. The non-transitory computer readable medium according to claim 17, wherein said defined location is a location of a word in which said start-of-padding field is located.

20. The non-transitory computer readable medium according to claim 17, wherein the processor is caused to designate an offset value of zero when no padding bits are inserted.

* * * * *